United States Patent
Drott et al.

(10) Patent No.: US 6,775,979 B1
(45) Date of Patent: Aug. 17, 2004

(54) ACTUATION DEVICE FOR AN ELECTROHYDRAULIC BRAKING SYSTEM

(75) Inventors: Peter Drott, Frankfurt am Main (DE); Horst Krämer, Ginsheim-Gustavsburg (DE); Jan Hoffmann, Schwalbach (DE); Hans-Jörg Feigel, Rosbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 284 days.

(21) Appl. No.: 10/019,875

(22) PCT Filed: Jun. 26, 2000

(86) PCT No.: PCT/EP00/05925

§ 371 (c)(1),
(2), (4) Date: Apr. 26, 2002

(87) PCT Pub. No.: WO01/00465

PCT Pub. Date: Jan. 4, 2001

(30) Foreign Application Priority Data

Jun. 29, 1999 (DE) .......................... 199 29 877

(51) Int. Cl.[7] ............................... B60T 11/20
(52) U.S. Cl. .............................. 60/588; 60/589; 60/591
(58) Field of Search .......................... 60/591, 588, 589

(56) References Cited

U.S. PATENT DOCUMENTS

| 5,031,968 A | * | 7/1991 | Takata ........................ 60/582 |
| 5,531,509 A | | 7/1996 | Kellner et al. |
| 5,720,170 A | * | 2/1998 | Hageman et al. ............. 60/591 |
| 5,813,230 A | | 9/1998 | Hartl et al. |
| 5,887,432 A | * | 3/1999 | Clauss et al. ................. 60/589 |

FOREIGN PATENT DOCUMENTS

DE 196 51 153 6/1998

* cited by examiner

Primary Examiner—Edward K. Look
Assistant Examiner—Igor Kershteyn
(74) Attorney, Agent, or Firm—Honigman, Miller, Schwartz and Cohn LLP

(57) ABSTRACT

The present invention relates to an actuation device for an electrohydraulic brake system of the 'brake-by-wire' type which is configured as a tandem master cylinder with a first and a second piston that are respectively biased by a resetting spring in opposition to the actuating direction. The resetting spring associated with the first piston is additionally used as a travel simulator spring which determines the pedal characteristics, and a valve device is provided which closes or opens a hydraulic connection between a pressure chamber accommodating the travel simulator spring and a pressure fluid supply reservoir.

To ensure that only a small lost travel must be covered in the event of failure of the independent brake force, the present invention discloses that the valve device is adapted to be closed by the movement of the second piston in relation to the housing of the tandem master cylinder, and is formed by a sealing sleeve arranged at the second piston and a channel that is designed in the area of movement of the sealing sleeve and connected to the pressure fluid supply reservoir.

19 Claims, 2 Drawing Sheets

ACTUATION DEVICE FOR AN ELECTROHYDRAULIC BRAKING SYSTEM

TECHNICAL FIELD

The present invention relates to an actuation device for an electrohydraulic brake system of the 'brake-by-wire' type which includes a first piston (push rod piston) that is operable by means of an actuating pedal and biased by a first resetting spring, and a second piston (floating piston) biased by a second resetting spring, the said pistons being arranged one behind the other in a housing and limiting pressure chambers that are in connection with an unpressurized pressure fluid supply reservoir, the said pressure chambers being closable by means of a first and a second valve device, wherein at least the first resetting spring is designed as a travel simulator spring that determines the pedal characteristics, with a sealing sleeve which is arranged at the second piston and limits the first pressure chamber that is assigned to the first piston, and with a third valve device which closes or opens a hydraulic connection between the first pressure chamber and the pressure fluid supply reservoir.

BACKGROUND OF THE INVENTION

An actuation device of this type is e.g. disclosed in DE 196 51 153 A1. The special features of the state of the art actuation device relate to the design of the above-mentioned third valve devices which are configured as so-called central valves and, compared to a conventional tandem master brake cylinder, have considerably longer lost travels or closure travels. The extended lost travels permit a movement of the hydraulic pistons during braking by independent force, in the course of which brake fluid cannot be conducted from the master brake cylinder into the wheel brake cylinders because the first and second valve devices are closed. However, the lost travels encountered upon failure of the independent brake force, which are felt at the actuating pedal, are considered disadvantageous in the prior art actuation device.

BRIEF SUMMARY OF THE INVENTION

In view of the above, an object of the present invention is to disclose an actuation device of the type mentioned hereinabove wherein only a short lost travel must be covered in the event of failure of the independent brake force.

A first solution of this object includes that the third valve device is adapted to be closed by the movement of the second piston in relation to the housing, and is formed by the sealing sleeve and a channel that is designed in the area of movement of the sealing sleeve and connected to the pressure fluid supply reservoir. This measure permits achieving a deactivation of the simulator effect during emergency operation, with a view to reaching short pedal travels.

In a particularly favorable aspect of the object of the present invention, a short overall length is achieved because the first piston is guided in the housing and also by means of the second piston. For this purpose, the first piston includes a bore which accommodates a cylindrical extension of the second piston.

In another favorable embodiment of the present invention, the cylindrical extension in the first piston confines a hydraulic chamber which is in connection to the pressure fluid supply reservoir by way of a hydraulic resistor.

The hydraulic resistor is preferably dependent on the position of the actuating pedal. An effective attenuation during actuation of the simulator is achieved by the above-mentioned measures.

To ensure that the pressure which is introduced into the wheel brakes connected to the first pressure chamber can be reduced in a situation where the third valve device is closed and the valve devices that close the pressure chambers are opened, e.g. due to a defect, it is disclosed in the present invention that there is a connection between the hydraulic chamber and the first pressure chamber which is closable by means of a fourth valve device. It is especially favorable that the fourth valve device is closable by a relative movement between the first piston and the extension and is formed by a passage provided in the first piston and a sealing sleeve arranged at the extension.

A second solution of the above-mentioned object can be seen in that the third valve device is designed as a valve which is mechanically operable by a movement of the second piston in relation to the housing.

It has proved favorable to use a travel sensor signal for the detection of a driver's wish. In another embodiment of the subject matter of the present invention, the travel sensor signal is furnished by a travel measuring system integrated in the housing, and the first piston is designed as a component of the measuring system sensing the actuating travel.

In a travel measuring system which is very reliable in operation, signal generator elements of the travel measuring system are fitted to the cylindrical surface of the first piston, and the system's signal receiving elements are arranged in the housing.

DETAILED DESCRIPTION OF THE PREFERRED EMBODIMENTS

Figure 1:
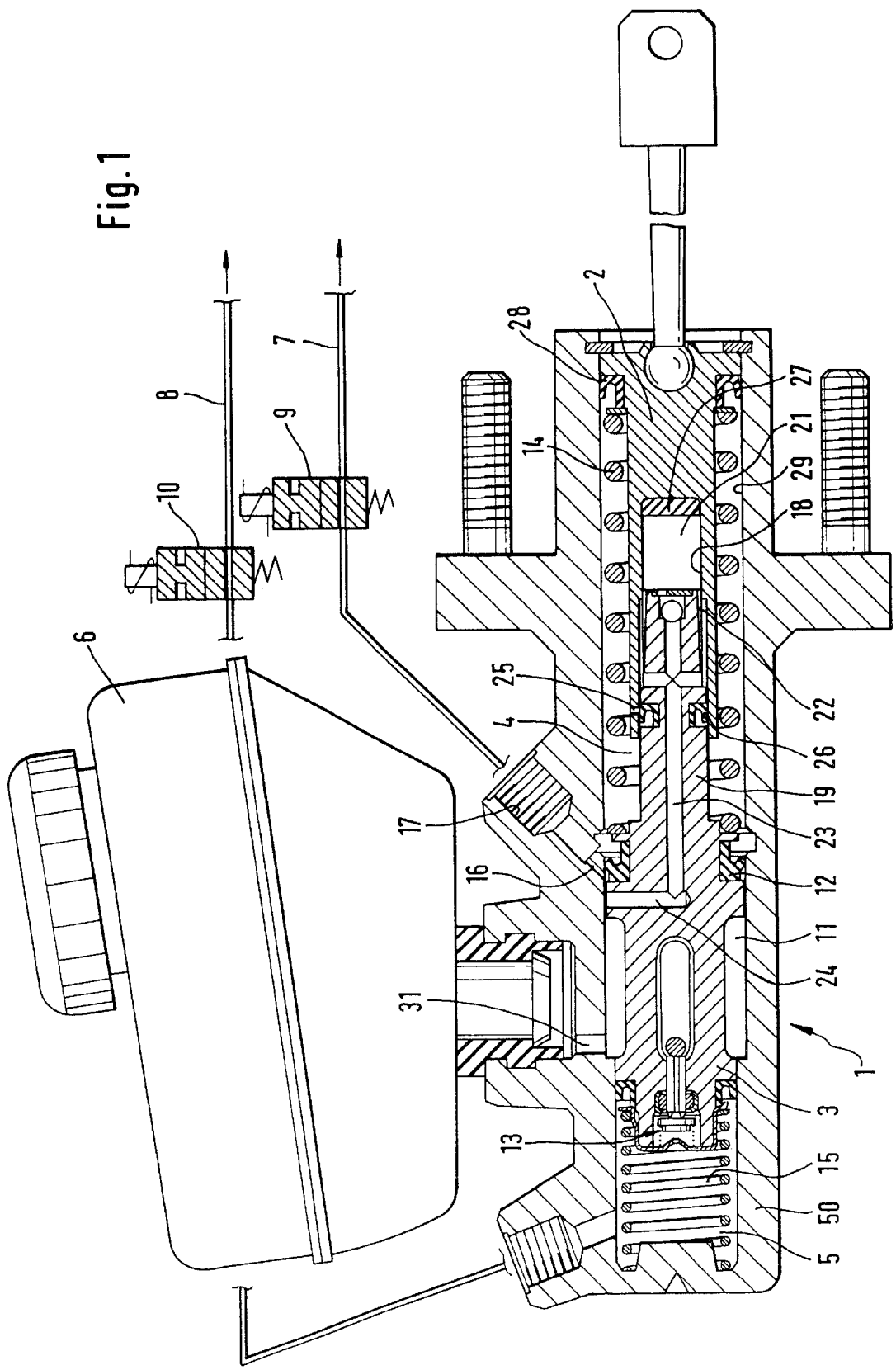
FIG. 1 is an axial sectional view of a first design of the actuation device of the present invention.

The actuation device illustrated in FIG. 1 is basically comprised of a dual-circuit pressure generator or tandem master cylinder 1 operable by means of an actuating pedal (not shown). In a bore 29, cylinder 1 includes pressure chambers 4, 5 which are separated from each other and confined by two pistons 2, 3. Also, chambers 4, 5 are in connection to an unpressurized pressure fluid supply reservoir 6 that preferably has a one-circuit design. Hydraulic wheel brakes (not shown) assigned to the vehicle axles are connected to the two pressure chambers (primary pressure chamber 4, secondary pressure chamber 5) by means of closable hydraulic connections 7, 8, which are only schematically shown. Closing of the hydraulic connections 7, 8 is e.g. effected by electromagnetically operable, normally open (NO) two-way/two-position directional control valves 9, 10. While the first piston 2 includes a sealing sleeve 28 which, additionally, seals the first pressure chamber 4 in relation to the atmosphere, the second piston 3 in the housing 20 of the tandem master cylinder 1 limits a supply chamber 11 which is connected, on the one hand, to the associated pressure chambers 4, 5 by way of a second sealing sleeve 12 arranged at the second piston 3 or a central valve 13 arranged in the second piston 3, and, on the other hand, to the pressure fluid supply reservoir 6 by way of a channel 31 provided in the master cylinder housing 50.

As can further be seen from FIG. 1, the mentioned pressure chambers 4, 5 accommodate a first and a second resetting spring 14, 15 which bias the pistons 2, 3 in opposition to their actuating direction or keep them in their initial position. In this arrangement, the force of the resetting spring 15 associated with the second piston 3 is greater than the force of the first resetting spring 14 which, additionally, performs the function of a simulator spring, which determines the pedal characteristics when the pressure chambers 4, 5 are closed and imparts the usual pedal feeling to the driver of the vehicle. In order to permit a movement of the first piston 2 relative to the housing 50 upon closing of the pressure chambers 4, 5, the said movement causing a compression of the first resetting or simulator spring 14, a hydraulic connection is provided between the first pressure chamber 4 and the pressure fluid supply reservoir 6 or the above-mentioned channel 14 and must be interrupted or closed in the event of an emergency stop. In the example shown in FIG. 1, the hydraulic connection is configured as a channel 16 which, starting from a port 17 associated with the hydraulic connection 7, in the actuating direction of the pistons 2, 3 behind the sealing sleeve 12, opens into the bore 29 in the housing 50, in which bore the pistons 2, 3 are guided or, respectively, in which the pressure chambers 4, 5 are incorporated. It is achieved by the arrangement described hereinabove that the pressure fluid can be conducted from the first pressure chamber 4 past the sealing sleeve 12 (which is not moved when the second pressure chamber 5 is closed) into the pressure fluid supply reservoir 6. In contrast thereto, the two pistons 2, 3 are displaced in the event of an emergency stop, where the above-mentioned shut-off valves 9, 10 remain open, so that the sealing sleeve 12 arranged on the second piston 3 will override the port of the channel 16 and interrupt the connection between the first pressure chamber 4 and the pressure fluid supply reservoir 6, thereby permitting hydraulic pressure to build up in the first pressure chamber 4.

As becomes apparent from FIG. 1, the first piston 2 includes a blind-end bore 18 which receives an axial cylindrical extension 19 of the second piston 3. The front surface of the extension 19 bounds a hydraulic chamber 21 which is in connection to the supply chamber 11, on the one hand, and to the first pressure chamber 4, on the other hand.

The connection to the supply chamber 11 is preferably effected by way of a hydraulic resistor 22 at the end of the extension 19 and by two bores 23, 24 that are vertical to one another, with the hydraulic resistor 22 being formed by triangular ribs, for example, which are overridden by the cylindrical wall of bore 18 so that the effect of the hydraulic resistor 22 depends on the actuating travel of the first piston 2. The chamber 21 is connected to the first pressure chamber 4 by way of a passage 25 that is designed in the second piston 2 and cooperates with a sealing sleeve 26 arranged on the extension 19, with the result that in the event of a movement of the first piston 2 in relation to the second piston 3, the sealing sleeve 26 is overridden by the passage 25 and the first pressure chamber 4 is isolated from the hydraulic chamber 21. It is now assumed that the sealing sleeve 12 had overridden the channel 16 during a braking operation, that a hydraulic pressure was built up in the wheel brakes (not shown) and that the two-way/two-position directional control valve 9 which closes the first pressure chamber 4 was opened e.g. due to a defect. When the actuating force is reduced which causes resetting of the first piston 2, the sealing sleeve 26 is overridden by the passage 25 in opposition to the actuating direction so that the pressure which acts in the first pressure chamber 4 can be reduced by way of the connection between the first pressure chamber 4 and the hydraulic chamber 21 that is now open. An elastic stop 27 is interposed between the pistons 2, 3 to eliminate the metallic noises which are produced in the event of a quick actuation where the first piston 2 meets the second piston 3. In the embodiment shown in FIG. 1, the stop is a rubber-elastic plate which is arranged in the hydraulic chamber 21 and is axially supported on the first piston 2.

Figure 2:
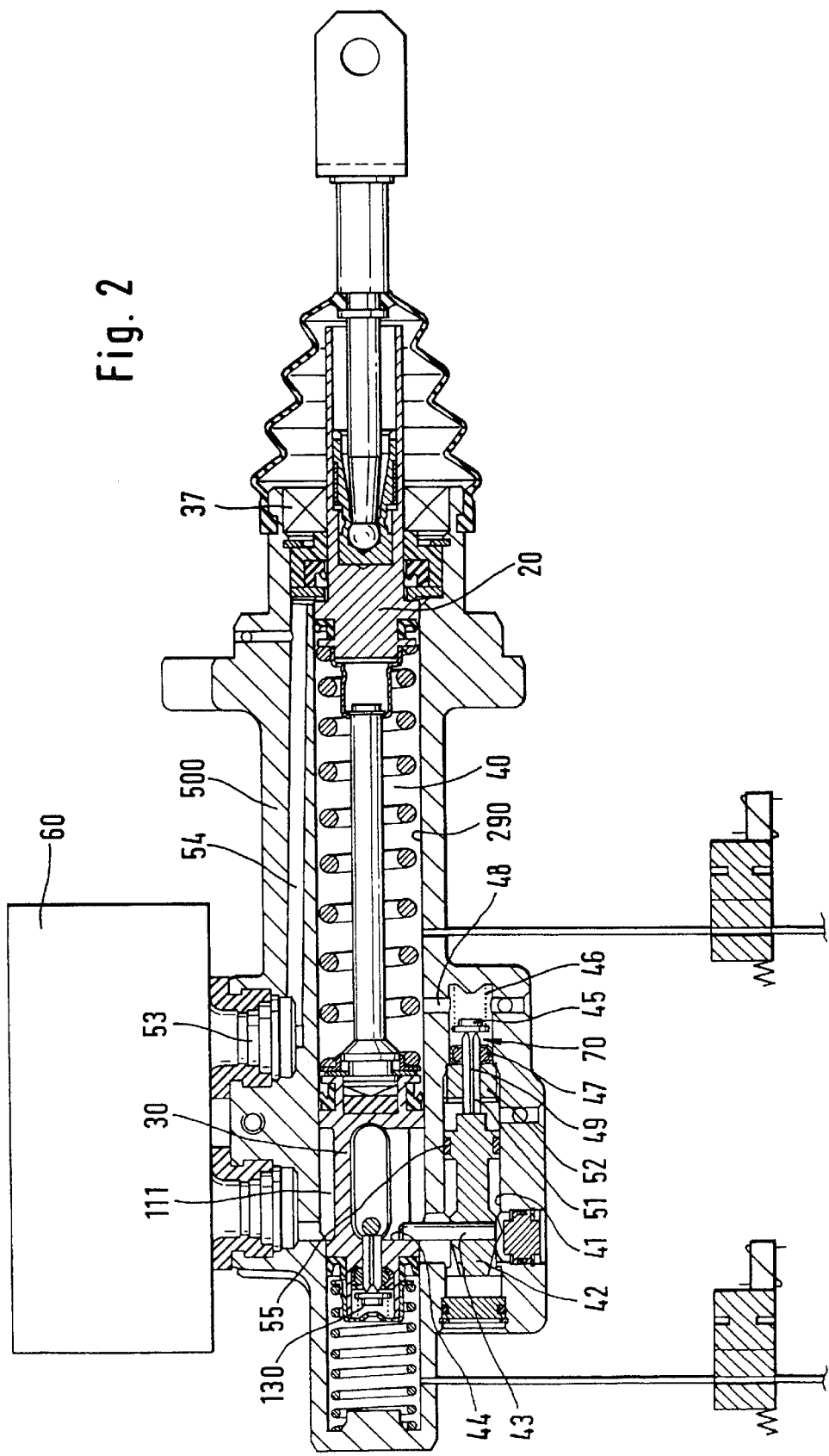
FIG. 2 is a view of a second design of the actuation device of the present invention in an illustration that corresponds to FIG. 1.

The design of the second embodiment of the present invention illustrated in FIG. 2 basically corresponds to what has been explained with respect to FIG. 1. The third valve device mentioned in the above text which, in its open position, permits the propagation of pressure fluid from the first pressure chamber 40 into the pressure fluid supply reservoir 60 is configured as a seat valve 70 in the second embodiment. Valve 70 is mechanically operable by a movement of the second piston 30 in relation to the housing 500. For this purpose, a force-transmitting element 42 is sealedly guided in a bore 41 of the housing 500 which extends in parallel to bore 290 that accommodates the two pistons 20, 30. Attached in element 42 is a transverse member 43 which bears axially against an abutment surface 44 provided at the second piston 30. A valve member 45, biased by a valve spring 46, is supported on the force-transmitting element 42. Valve member 45, in cooperation with a valve seat 47, can close a hydraulic connection between the first pressure chamber 40 and the pressure fluid supply reservoir 60. The hydraulic connection is composed of a bore 48 that extends from the first pressure chamber 40, a part of the above-mentioned bore 41, and a channel (not shown) which is in connection to a reservoir port 53 associated with the first pressure chamber 40 and, respectively, a supply bore 54 connected to the reservoir port 53. The seat valve 70 is preferably designed so that the closure travel of its valve member 45 is longer than the closure travel of the central valve 130 arranged in the second piston 30. A guide ring 52 extending through which is an axial extension 49 of the valve member 45 is used to guide the valve member 45. The axial extension 49 includes radial ribs 51 in order to ensure a proper flow of the hydraulic pressure fluid between the first pressure chamber 40 and the pressure fluid supply reservoir 60.

An important technical aspect in all brake systems of the 'brake-by-wire' type is considered to be the reliable detection of the driver's wish for deceleration. It has proved favorable in the course of developments that signals originating from systems or sensor assemblies which sense the actuating travel of the actuation device can be used for this purpose. Therefore, proposals have been made to provide a travel measuring system 37 (only shown schematically) in the entry area of the housing 500. The elements (not shown) of system 37 which are responsible for the generation of signals are mounted on the cylindrical surface of the first piston 20, while the system's signal receiving elements are integrated in the housing 500.

Upon failure of the electronic unit that controls the electrohydraulic brake system, it must be ensured that the connection between the first pressure chamber 40 and the pressure fluid supply reservoir 60 is interrupted. On the other hand, brake pressure for the schematically shown brake circuit would not be able to develop in the first pressure chamber 40. When the actuation device of the present invention is now actuated by depression of the brake pedal (not shown), the two pistons 20, 30 will be moved to the left, as viewed in the drawing, in a per se known manner, with the transverse member 43 following the second piston 30 under the bias of the valve spring 46 until the valve member 45 moves into abutment on the sealing seat 47.

The force-transmitting element 42 which is sealedly guided in the bore 41, along with a sealing sleeve 55, forms a hydraulic effective surface which, in the open position of the seat valve 70, is acted upon by the pressure fluid that flows out of the first pressure chamber 40. A force develops as a result which supports the force of the valve spring 46 and, thus, the closure of the seat valve 70. However, it is of course also possible to omit the sealing sleeve 55 and to furnish the force-transmitting element 42 e.g. with guide ribs so that the first pressure chamber 40 is connected to the supply chamber 111 associated with the second pressure chamber 50 by way of the open seat valve 70. In this case, the above-mentioned connection (not shown) between the bore 41 and the pressure fluid supply reservoir 60 is eliminated.

We claim:

1. Actuation device for an electrohydraulic brake system of the 'brake-by-wire' type comprising:
    a first piston that is operable by means of an actuating pedal and biassed by a first resetting spring,
    a second piston biassed by a second resetting spring,
    the said pistons being arranged one behind the other in a housing and limiting pressure chambers that are in connection with an unpressurized pressure fluid supply reservoir,
    hydraulic lines closable by means of a first and a second valve device being connected to the pressure chambers,
    with at least the first resetting spring being designed as a travel simulator spring that determines the pedal characteristics,
    a sealing sleeve which is arranged at the second piston and limits the first pressure chamber that is assigned to the first piston,
    and a third valve device which closes or opens a hydraulic connection between the first pressure chamber and the pressure fluid supply reservoir,
    wherein the third valve device is adapted to be closed by the movement of the second piston in relation to the housing, and is formed by the sealing sleeve and a channel that is designed in the area of movement of the sealing sleeve and connected to the pressure fluid supply reservoir.

2. Actuation device for an electrohydraulic brake system of the 'brake-by-wire' type comprising:
    a first piston that is operable by means of an actuating pedal and biassed by a first resetting spring,
    a second piston biassed by a second resetting spring,
    the said pistons being arranged one behind the other in a housing and limiting pressure chambers that are in connection with an unpressurized pressure fluid supply reservoir, hydraulic lines closable by means of a first and a second valve device being connected to the pressure chambers,
    with at least the first resetting spring being designed as a travel simulator spring that determines the pedal characteristics,
    and a third valve device which closes or opens a hydraulic connection between the first pressure chamber and the pressure fluid supply reservoir,
    wherein the third valve device is designed as a valve that is mechanically operable by a movement of the second piston in relation to the housing.

3. Actuation device as claimed in claim 1, wherein the first piston is guided in the housing and also by means of the second piston.

4. Actuation device as claimed in claim 3, wherein the first piston includes a bore which accommodates a cylindrical extension of the second piston.

5. Actuation device as claimed in claim 4, wherein the cylindrical extension in the first piston confines a hydraulic chamber which is in connection to the pressure fluid supply reservoir by way of a hydraulic resistor.

6. Actuation device as claimed in claim 5, wherein the hydraulic resistor is dependent on the position of the first piston with respect to the second piston.

7. Actuation device as claimed in claim 5, wherein there is a connection between the hydraulic chamber and the first pressure chamber which is closable by means of a fourth valve device.

8. Actuation device as claimed in claim 7, wherein the fourth valve device is closable by a relative movement between the first piston and the second piston.

9. Actuation device as claimed in claim 8, wherein the fourth valve device is formed of a passage provided in the first piston and cooperating with a sealing sleeve that is arranged on the extension.

10. Actuation device as claimed in claim 2, further including an elastic stop arranged between the first and the second piston.

11. Actuation device as claimed in claim 10, wherein the elastic stop is arranged in the hydraulic chamber.

12. Actuation device as claimed in claim 2, further including a sealing sleeve which is arranged on the first piston and seals the first pressure chamber,
    wherin the sealing sleeve seals the first pressure chamber in relation to the atmosphere.

13. Actuation device as claimed in claim 2, wherein the pressure fluid supply reservoir includes one single supply chamber.

14. Actuation device as claimed in claim 2, wherein the mechanically operable valve is designed as a seat valve and includes a valve member which is biassed in its closing direction by means of a valve spring and is operable by means of a transverse member that axially bears against the second piston.

15. Actuation device as claimed in claim 14, with the second valve device being configured as a central valve, wherein the closure travel of the valve member is longer than the closure travel of the central valve.

16. Actuation device as claimed in claim 15, wherein the valve member is guided in a guide ring, there being provision of an axial extension with axial ribs that serves to guide the valve member.

17. Actuation device as claimed in claim 14, wherein the transverse member cooperates with a force-transmitting element on which the axial extension abuts and which represents a hydraulic effective surface to which, in the open position of the valve, the pressure fluid is applicable that flows out of the first pressure chamber.

18. Actuation device as claimed in claim 2, wherein the first piston is configured as a component part of a travel measuring system which senses the actuating travel and is integrated in the housing.

19. Actuation device as claimed in claim 18, wherein signal generator elements of the travel measuring system are fitted to the cylindrical surface of the first piston, while the system's signal receiving elements are arranged in the housing.

* * * * *